US008621108B2

(12) United States Patent
Kamrowski et al.

(10) Patent No.: US 8,621,108 B2
(45) Date of Patent: Dec. 31, 2013

(54) SYSTEM AND METHOD FOR MONITORING USER INTERFACE CONNECTIVITY STATE

(75) Inventors: Brian Kamrowski, Amherst, NY (US); Ronald D. Olsen, Lake View, NY (US)

(73) Assignee: Dialogic Corporation, Montreal (CA)

( * ) Notice: Subject to any disclaimer, the term of this patent is extended or adjusted under 35 U.S.C. 154(b) by 568 days.

(21) Appl. No.: 12/151,648

(22) Filed: May 8, 2008

(65) Prior Publication Data

US 2009/0282096 A1    Nov. 12, 2009

(51) Int. Cl.
*G06F 15/16* (2006.01)
*G06F 15/177* (2006.01)

(52) U.S. Cl.
USPC ............ 709/248; 709/220; 709/221; 709/222

(58) Field of Classification Search
USPC .......................................... 709/220–222, 248
See application file for complete search history.

(56) References Cited

U.S. PATENT DOCUMENTS

| | | | | |
|---|---|---|---|---|
| 2001/0037292 | A1* | 11/2001 | Vogt | 705/39 |
| 2002/0174180 | A1* | 11/2002 | Brown et al. | 709/203 |
| 2003/0001888 | A1* | 1/2003 | Power | 345/744 |
| 2004/0201604 | A1* | 10/2004 | Kraenzel et al. | 345/700 |
| 2005/0262231 | A1* | 11/2005 | Lowe et al. | 709/223 |
| 2007/0113188 | A1* | 5/2007 | Bales et al. | 715/742 |
| 2007/0174419 | A1* | 7/2007 | O'Connell et al. | 709/217 |
| 2007/0214239 | A1* | 9/2007 | Mechkov et al. | 709/219 |
| 2008/0028313 | A1* | 1/2008 | Ebert | 715/730 |
| 2009/0099939 | A1* | 4/2009 | Thakur et al. | 705/26 |
| 2009/0158108 | A1* | 6/2009 | Manning et al. | 714/746 |
| 2009/0228606 | A1* | 9/2009 | McCarthy et al. | 709/248 |

* cited by examiner

*Primary Examiner* — Chau Le
(74) *Attorney, Agent, or Firm* — Chapin IP Law, LLC (57) ABSTRACT

A user interface and gateway can be synchronized with each other by maintaining a sequential synchronization parameter in the network gateway, which value is retrieved from the network gateway and compared against a stored value in the user interface. If the retrieved synchronization value is other than expected in comparison with the stored synchronization value, the user interface is reloaded from the network gateway. The synchronization parameter may be a counter that is incremented based on the occurrence of a given event, such as a request provided by the user interface. The user interface may intermittently request retrieval of the synchronization parameter to verify synchronization between the user interface and the network gateway. The synchronization mechanism can operate in unidirectionally triggered communication protocol environments, as may be implemented in web 2.0 applications with pull technology.

32 Claims, 2 Drawing Sheets

SYSTEM AND METHOD FOR MONITORING USER INTERFACE CONNECTIVITY STATE

CROSS REFERENCE TO RELATED APPLICATIONS

N/A

STATEMENT REGARDING FEDERALLY SPONSORED RESEARCH OR DEVELOPMENT

N/A

BACKGROUND

The presently disclosed system and method relate generally to network communication practices, and more particularly to synchronization of a network user interface and a network service device.

A network service device, such as a gateway or router, can be arranged to be accessed through a number of different network topologies, including topologies with unidirectionally triggered communication. For example, a network service device may be implemented in accordance with a web 2.0 application standard, in which the network service device provides responses to requests, but does not otherwise actively send or "push" information to another entity on the network in the absence of a request from such an entity. This type of arrangement is also referred to as pull technology, in which an initial request for data originates from a client, prompting a response from a server. Pull technology is used extensively in networks such as the internet for handling client requests from servers hosting a website, for example.

The state of a network service device is typically monitored through a User Interface (UI), which can provide a user with information related to the network service device. For example, the network service device can be a gateway, which is a telecommunications deice that can serve as a network node to provide translation or mapping of protocols between different networks, such as between a traditional telephone network and a voiceover IP (VoIP) network. An example of such a gateway, sometimes referred to as a media gateway, is the Dialogic 1000 Media Gateway series or the Dialogic 2000 Media Gateway series, which are commercially available from Dialogic Corporation of Montreal, Quebec, Canada. The UI can be a web browser on a PC. The network service device can be updated or changed, such as may occur with configuration changes to the network service device, firmware updates, or system reboots. The UI may be located remotely from the network service device, and connected to the network service device through the communication network. Accordingly, updates or modifications to the network service device may or may not involve the UI, which may be rendered on a display device that is different and separate from the network service device.

In a communication network that is arranged with pull technology as described above, the network service device may be updated or modified without indicating the same to the UI. When utilizing pull technology, the UI requests data from the network device, and unprompted, the network device does not send any type of update to the UI. Accordingly, updates or modifications or other changes in state or status of the network service device go unnoticed by the UI.

Updates and changes to the network service device may implement new functions or features that should be reflected in the UI. The new functions or features that can be implemented may appear as new entries in the UI, such as may be implemented with new menu selections, push buttons, radio buttons, drop-down boxes, text boxes, or other types of representations that may be implemented in the UI for expressing information concerning the UI or the network service device.

Because of the lack of an update to the UI, errors may occur in how the UI presents data retrieved from the network service device. For example, the UI configuration may expect certain data at certain data locations derived from the network service device to be presented in the display configuration of the UI. In typical operation, the UI polls or requests small amounts of data from the network service device. For example, the UI may poll or request data for purposes such as to obtain updates of certain parameters made available by the network service device. The UI does not typically reload entire pages of data that may be available from the network service device, and does not cause itself to be re-rendered, which would implicate requests from the UI to the network service device for entire pages to be reloaded from the network service device to the UI. Instead, the use of polling and requests for data on a limited basis, or in small quantities, reduces the burden on the network service device and the communication channel between the UI and the network service device and facilitates display of information in the UI that appears to be based on a live connection. If the UI were to continually request the reload of pages, or to cause itself to be re-rendered, the performance impact would severely limit the usefulness of the UI in monitoring the network service device. For example, the reloaded or re-rendered pages would continually flash with the constant requests for page reload or re-rendering, severely detracting from the appearance of the UI. Reloaded or re-rendered pages may also change the focus of the page on a continual basis leading to undesirable operation of the UI. The focus indicates a component of the UI that is currently selected to receive input, such as providing text in a text box. The focus changes in correspondence with other components in the UI that are selected for input. If re-rendered or reloaded pages change the focus in undesired or unexpected ways from a user perspective, the usefulness of the UI can be severely curtailed. Accordingly, normal operation for the UI calls for limited amounts of data to be requested from the network service device, so that the UI can be rendered dynamically.

If the configuration of the network service device changes, the existence, locations or values of parameters or features may change, leading the UI to display incorrect or inappropriate data. In such a situation, the UI may no longer be compatible with the network service device. Various operations that may occur at the network service device that do not involve the UI include a system reboot, configuration changes and firmware updates, as well as other types of modifications that may occur to the network service device without notice to the UI. Accordingly, the UI is unaware that it should be re-rendered to properly reflect the change in state of the network service device. Due to the use of pull technology in the given network, the UI does not receive any unrequested information that might be related to re-rendering itself to update the display of the UI in accordance with the configuration changes of the network service device. Because the network service device and UI can become unsynchronized with each other, the UI may display erroneous information, such as broken menu/page links, outdated pages and invalid/outdated data.

SUMMARY

The disclosed system and method provides a mechanism for synchronizing a user interface (UI) and a network service device, such as a gateway, by providing a synchronization parameter from the network service device to the UI. The network service device includes an embedded server, such as a web server, that provides data to the UI in response to polling or requests from the UI. As part of a response, the server provides a synchronization parameter to the UI that is stored or maintained by the UI. The UI, upon receipt of a response from the server that includes the synchronization parameter, checks the value of the synchronization parameter in the response against the stored synchronization parameter value maintained by the UI. If the result of the comparison indicates that the UI and the server are out of synchronization, the UI then submits a request to the server to reload the UI. Reloading the UI causes the UI to be rendered with the most current configuration and information available from the server. If the result of the comparison between the synchronization parameters indicates that the UI and the server are synchronized, a reload and/or rendering of the UI is deemed unnecessary.

The synchronization parameter can take the form of a counter value, or any other type of parameter that can indicate when the UI and server are synchronized or unsynchronized. For example, the synchronization parameter can be a timer or timer value that is updated on a regular basis, such as every second, and transmitted to the UI along with information requested by the UI. As another example, the synchronization parameter can be a timestamp found in an HTTP header, which is updated and transmitted with each request and response between the UI and the server. The synchronization parameter can also be implemented as a threshold value, for example. The UI maintains a synchronization value and compares it to a threshold value provided by the server. If the synchronization value is above or below the threshold, the UI can make a determination regarding synchronization. The synchronization parameter may also be determined by a state machine operating in the UI and in the server. When the UI receives a synchronization value that is other than expected, with respect to the state machine, the UI can determine that synchronization has been lost. In general, a synchronization parameter can be provided as a progression of a trend to provide an expected relationship between the synchronization value maintained by the UI and the synchronization value maintained by the server. When the relationship between the two synchronization values is determined to be other than expected, the UI can conclude that synchronization has been lost, and take appropriate recovery action.

In an exemplary aspect of the disclosed system and method where the synchronization parameter is a counter value, the server increments the counter with the occurrence of a predetermined event, such as the receipt of a request from the UI. The UI may request the value of the counter on an intermittent basis, such as every 5 seconds, and check the value of the counter against a stored value maintained by the UI. If the result of the comparison indicates that the UI and the server are in synchronization, for example, the counter value stored by the UI is less than the counter value provided by the server, a reload or rendering of the UI is deemed unnecessary, and the UI stores the new counter value received from the server. If the result of the comparison indicates that the UI and the server are not in synchronization, because the server counter value is less than the UI counter value, the UI can perform a recovery action. For example, the UI can request a reload and/or rendering of the UI, along with a new counter value from the server to be stored in the UI. According to an aspect of the disclosed system and method, the counter value can be transmitted in an XML file from the server.

Upon determining that the UI and the server are not in synchronization, the UI can perform a recovery action to cause a browser that is displaying UI information to load a default or recovery page. According to one aspect, the disclosed system and method provides for a message to be displayed in the UI prior to submitting a request to the server to reload or render the UI. Loading a default page causes a request of the page from the server and provides that the UI and server are synchronized. Any other type of recovery mechanism may be employed once the UI and server are determined to be out of synchronization. For example, a portion of a page or elements of a page can be loaded from the server to the UI to reduce the amount of data transferred between the server and the UI. In addition, upon detection of loss of synchronization, the UI may cause a default page stored or referred to by the UI to be displayed in the browser while the desired data or pages are retrieved from the server. According to an aspect, the disclosed system and method may cause a message to be displayed in the UI upon the detection of a loss of synchronization between the UI and the server. Such a message may be desirable in the case where synchronization is lost and not regained for an extended period of time, for example.

BRIEF DESCRIPTION OF THE SEVERAL VIEWS OF THE DRAWINGS

The disclosed system and method is described in greater detail below, with reference to the accompanying drawings, in which.

DETAILED DESCRIPTION

Network service devices, such as a gateway, can be implemented to include a number of features for configuring or providing information about the configuration or operation of the network service device. For example, an embedded web server can be provided to a network service device, to permit data to be communicated from the network service device to client devices that are connected to the server over a network, such as a local area network, a wide area network, an intranet, the Internet, or any other type of communication network that permits a server in the network to transfer data to a client in the network. An example of such a gateway, sometimes referred to as a media gateway, implemented as a network service device with an embedded server, is the Dialogic 1000 Media Gateway series, or the Dialogic 2000 Media Gateway series, which are commercially available from Dialogic Corporation of Montreal, Quebec, Canada. A typical server implementation uses the TCP/IP (Transmission Control Protocol/Internet Protocol) to transport data across a packet switched communication network. The server may provide such data in accordance with various standards and formats. For example, the server may comply with a web 2.0 application framework for network-oriented applications. The server may also provide XML (Extensible Markup Language) formatted information for web pages, as well as HTML (Hypertext Markup Language) formatted information for web pages that operate in conjunction with JavaScript executing on the client.

When a server is configured to communicate with a client in accordance with a web 2.0 type application, by definition the server does not poll or request information from the client, but rather relies on the client to poll or request information from the server. This type of standardized, pull technology communication configuration provides enhancements to client/server type network configurations, such as avoiding throughput bottlenecks, improving robustness and in efficiency of the client/server information exchange. Accordingly, the information provided by the server to the client is a result of requests sent from the client to the server for information.

A client application can provide a user interface (UI) through a browser, for example, for conducting operations on the attached network, including sending and receiving information to and from a server. The UI can be implemented in the client in accordance with numerous techniques or configurations in addition to, or as an alternative to an implementation using a browser. For example, the UI may be implemented as a Java applet or as a stand-alone application provisioned with a suitable network communication protocol, such as HTTP (hypertext transfer protocol). The server can be implemented to support a variety of communication protocols for use with the UI implementation, including proprietary protocols in the event a non-browser oriented UI is implemented using HTTP, the configuration of the server used to communicate with the browser need not be modified. According to one embodiment, the UI may be implemented as a stand-alone application that can be used with or inserted into another application implemented by a user or a third party application provider. In such an instance, the UI can be implemented through the provisioning of a dynamic link library (DLL) that includes API (application programming interface) functions to read or write configuration settings in communications between the client an server using HTTP. Accordingly, while the number of configurations may be used for implementation, the UI adheres to the conventions provided in accordance with a web 2.0 type application. In the following description, the exemplary embodiment of the UI implemented with a browser is described, however, it should be apparent to those of ordinary skill that any of the above-described UI configurations may be similarly implemented within the scope of the present disclosure.

A client application, such as the UI, typically provides the user with a mechanism for displaying, manipulating, storing, sending and receiving data. When the communication network is a packet switched type network, the UI is typically implemented through a browser that provides a display rendered through JavaScript using AJAX with information supplied in the form of XML or HTML formatted data. JavaScript is a scripting language that can be used to write functions that can be embedded or included in HTML pages, and interacts with a document object model (DOM) of the page. AJAX is a group of web developments techniques for creating interactive or dynamic web applications. AJAX developed web applications permit data updates to be achieved through small amounts of data obtained from a server to be provided to a client application without having to reload entire data sets, such as, for example, an entire web page. A DOM is a platform and language independent object model for representing HTML or XML formatted data. DOM is used by JavaScript scripts to inspect or modify a web page or XML formatted data dynamically.

Typically, a UI implemented through a browser has pages which are updated dynamically or in subsets of entire pages. The UI can request small amounts of data from a desired server to update the web pages or information maintained in the UI. The UI can be configured to poll the server to determine when data updates are available and obtain such updated data for display in the browser. For example, AJAX can be used to form client web pages in the web browser that appear to have a live connection with a web server, such as an embedded server operating within a network service device, such as a gateway. Although such a connection may appear live by displaying constantly updated data from the server, the connection operates based on polling requests to the server to obtain information without client interaction, and without refreshing or reloading the web page. The dynamic update of a web page with discrete data or portions of the web page avoids the throughput and latency issues that may otherwise arise if entire web pages are customarily sent by the server with each polling request.

Because the client UI provides all the polling requests to the server, and the server does not otherwise provide responses or data to the UI, configuration changes implemented in the server go unnoticed by the UI. Thus, if the server is powered down or disabled, the UI simply continues to request data and may display incomplete, incorrect or default data when an appropriate response is not available from the server. However, if the server, or the network service device upon which the server is implemented, is reconfigured, such as by being provided with new software, hardware, firmware, new features or capabilities, or if the network service device is rebooted, then the UI has no indication of a change in state of the network service device or server. In such a scenario, the UI and server are out of synchronization.

In accordance with the presently disclosed system and method, the server provides a response to a UI request that includes a parameter to indicate a status of synchronization between the UI and the server. In one exemplary embodiment, the server provides a sequence counter value to the UI, which sequence counter value is initialized at zero when the server is booted or initialized. For example, a gateway that implements a web server can provide the sequence counter value to the UI in response to polling requests from the UI after the gateway begins execution following a cold or a warm boot. Each time the server is polled by the UI, the sequence counter value is incremented linearly. The UI can request the sequence counter value at regular intervals, such as, for example, every 5 seconds. When the UI makes such a request to the server, the server response includes the sequence counter value, which the UI stores or maintains upon receipt. For example, the UI may cache the sequence counter value in a local memory storage location. The stored or maintained sequence counter value in the UI is then compared against the sequence counter value received from the server as a result of the most recent sequence counter value request. Generally, the UI cached sequence counter value is less than the sequence counter value returned from the server. Such a circumstance, determined by comparing the two sequence counter values, indicates that the UI and the server are in synchronization.

If the gateway has been rebooted, reconfigured or otherwise experiences a change in state or status for which a UI refresh or reload is desired, the sequence counter value is reinitialized or started at zero. The restarted sequence counter value is less than the cached sequence counter value maintained by the UI, so that the UI can directly determine that a loss of synchronization has occurred. When the sequence counter value received from the gateway is less than the cached sequence counter value, a loss of synchronization is deemed to have occurred. Upon determining that the UI is out of sequence with the server, the UI is prompted to attempt a recovery. For example, a loss of synchronization may prompt a reload of the entire UI. A reload of the UI causes a retrieval and rendering of entire pages with their attendant XML and HTML formatted data using JavaScript, which data may have been reconfigured with a server reconfiguration, upgrade or other state or status changes to the server. The reload of the UI refreshes all the links, display elements, content, data and other elements of the browser, in accordance with the XML and HTML formatted data received from the server. The reload of the UI can be done on an entire page basis, rather than requesting and receiving discrete page components, or data. In addition, a UI reload can be conducted based on a selected page, such as an active page, or on a discrete page-by-page basis, for example.

Figure 1:
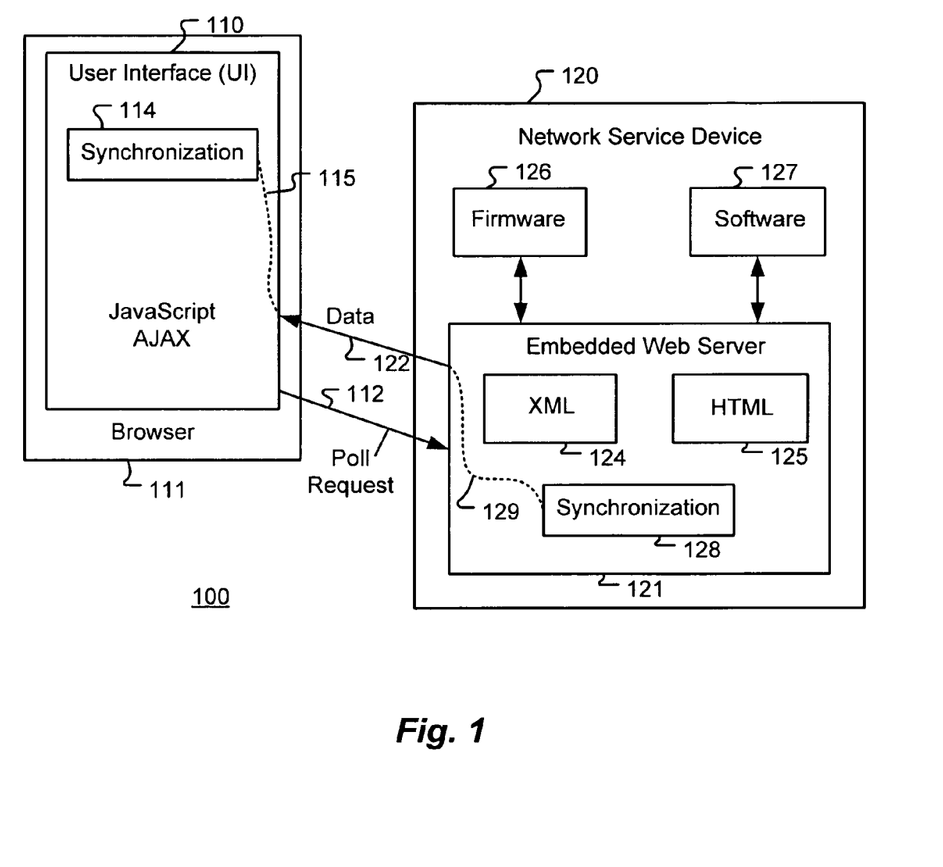
FIG. 1 is a diagram of a network arrangement involving a user interface and a network service device.

Referring now to FIG. 1, a diagram of a connectivity construct 100 between a client user interface 110 and a network service device 120 is illustrated. User interface 110 is implemented using a browser 111 that can render web pages using JavaScript calls and utilize AJAX to make dynamic data requests to permit a web page to be rendered without fetching or downloading an entire page. UI 110 submits a poll/request 112 and receives data 122 in conjunction with an embedded web server 121. Embedded web server 121 is implemented to carry out web server functions as a part or component in conjunction with the operation of network service device 120. Users or administrators can thus access network service device 120 remotely and obtain configuration, status and state information on a remote basis through embedded web server 121. While the description of the disclosed system and method illustrates an implementation using embedded web server 121, it should be apparent that any type of network service implemented to connect network service device 120 in a network may be used. For example, a network service module implemented in network service device 120 using pull technology can be used in accordance with the disclosed system and method.

Embedded web server 121 includes data formatting descriptions in the form of XML files 124 and HTML files 125. XML files 124 and HTML files 125 can incorporate parameters and values derived from network service device 120 to permit those parameters to be transferred to browser 111 in a data response 122. The configuration and operation of network service device 120 is generally provided by the implementation of firmware 126 and software 127. Firmware 126 and software 127 can be reconfigured or updated to establish new configurations for network service device 120. Embedded web server 121 may also be modified with changes to firmware 126 and/or software 127, such that the content or configuration of XML files 124 and/or HTML files 125 is changed. Typically, network service device 120 is taken off line or completely shut down with upgrades or changes to firmware 126 and/or software 127.

Embedded web server 121 includes synchronization component 128, which represents a parameter value that can be communicated to user interface 110, as indicated with dashed line 129. Synchronization 128 may include one or more values that can be updated or recorded based on certain time periods or events to provide a mechanism for synchronizing user interface 110 and server 121. In an exemplary embodiment, synchronization 128 includes a counter that is initially set to zero, and is incremented each time UI 110 provides a poll/request 112 to server 121. UI 110 requests the sequence counter value in synchronization 128 at regular intervals, such as every 5 seconds. UI 110 receives the sequence counter value through response data 122 as indicated with dashed line 129. Upon receipt, UI 110 stores or maintains the sequence counter value so that a comparison can be conducted with respect to further sequence counter values obtained from server 121.

Because UI 110 requests and stores the sequence counter value after it has been updated by server 121 based on requests submitted by UI 110, the sequence counter value stored in synchronization 114 of UI 110 is less than the sequence counter value stored in synchronization 128 in server 121, under normal circumstances. UI 110 compares the received sequence counter value of synchronization 128 with the stored sequence counter value of synchronization 114 to determine if the value of synchronization 114 is less than the value of synchronization 128. If the value of synchronization 114 is less than the value of synchronization 128, UI 110 and server 121 are declared in synchronization, and no reload of web pages to browser 111 is needed. If the value of synchronization 114 is greater than the value of synchronization 128, meaning that network service device 120 was off line, has been reconfigured or updated, for example, UI 110 causes pages in browser 111 to be reloaded from server 121, so that any reconfigured or modified web pages or web page content provided by server 121 can be rendered properly in browser 111.

The value of synchronization 114 may be greater than the value of synchronization 128 when network service device 120 is operating in an unknown state. For example, network service device 120 may be rebooted, crashed, frozen, updated with a new version of firmware 126 and/or software 127, may have a new configuration implemented, may not be providing current device information, or any other event or condition that can lead to a lack of communication between network service device 120 and UI 110, or an unknown state for network service device 120.

When UI 110 reloads web pages from server 121 upon determining that UI 110 and server 121 are not in synchronization, various mechanisms may be employed to force the reload of web pages. In accordance with an exemplary embodiment, a JavaScript routine operating through browser 111 changes the parent location to the root of UI 110. Such a command may have the following JavaScript syntax.

Top.location.href='/';
Such a script routine will cause the top-most HTML page or frame to load the default HTML page. The default HTML page is loaded from server 121, thereby resynchronizing UI 110 and server 121. In accordance with another exemplary embodiment, the synchronization recovery may be performed by reloading an individual element, such as a single page, frame or file in UI 110. Reloading an individual element instead of completely reloading UI 110 provides for less data to be transferred with a reduced burden on server 121 and the communication links implementing poll/request 112 and data response 122. In addition, if individual elements are reloaded instead of entire pages, the impact on the display of UI 110 may be less noticeable and more desirable to a user administrator viewing UI 110.

If UI 110 and server 121 fall out of synchronization with each other, an HTML link to a web page may be broken. Such a broken link can be resolved using a standard HTTP 302 or 404 response page, that can be provided by UI 110 or another URL (Uniform Resource Locator). Such a response to a broken HTML link may be provided regardless of whether UI 110 determines that synchronization with server 121 has been lost. The page provided in response to a broken HTML link may provide a manual or automatic redirect action to a known good page or URL. The manual redirect action can provide an error message and an HTML link, for example. The automatic redirect action can provide a meta refresh header with a timeout or a client-side JavaScript function that automatically loads a known good element.

The parameter used in synchronization 114 and 128 can be any type of parameter with some form of sequential or process-driven value such that UI 110 can determine when it is synchronized or out of synchronization with server 121. For example, UI 110 can provide a relative time and date value to server 121, which stores the time and date value to act as a reference for providing a synchronized time and date value. When UI 110 requests a parameter value from synchronization 128, the returned relative time and date value can be used to determine whether UI 110 and server 121 are in synchronization or not. Other synchronization parameter values that may be useful can include a parameter available from server 121 indicating the last time the server was reinitialized or rebooted, or the last time network service device 120 was reinitialized or rebooted. A number of other synchronization parameters may be used such that a relative sequence or progression can be established that permits UI 110 to determine a state of synchronization with server 121.

Figure 2:
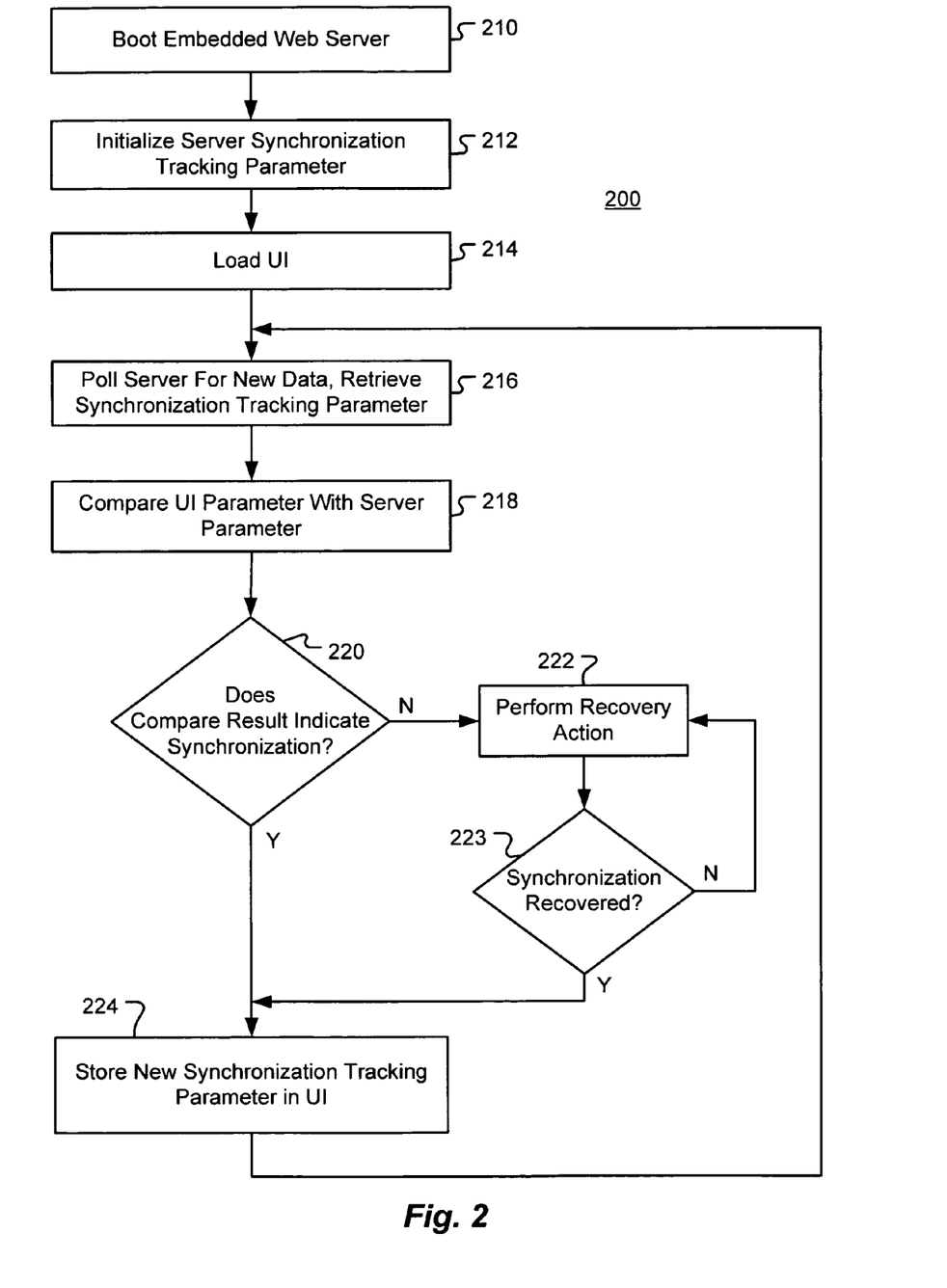
FIG. 2 is a flow chart illustrating synchronization recovery in accordance with the disclosed system and method.

Referring now to FIG. 2, a flow chart 200 illustrates a method in accordance with the present disclosure. In accordance with an exemplary embodiment, the process illustrated in flow chart 200 can be implemented on a Dialogic Media Gateway, available form Dialogic Corporation of Montreal, Quebec, Canada. The gateway can service a user interface as a web 2.0 application running on a PC web browser, through an embedded web server on the gateway. The user interface uses AJAX to poll HTML templates and dynamic XML data files from the gateway. In accordance with the disclosed system and method, a sequence counter is provided as a value contained in an XML data file. The process illustrated with flow chart 200 can be implemented with such a gateway, web server and web browser configuration, and may also be implemented in general in a client-server environment that operates using a pull technology communication protocol.

In block 210 of flow chart 200, an embedded web server is booted, and a server synchronization tracking parameter is initialized in block 212. The synchronization tracking parameter may, for example, be implemented as a sequence counter, which is initialized at a value of zero. After execution of block 212, the embedded web server is ready to service HTTP requests. In block 214, the user interface (UI) is loaded from the embedded web server. For example, an administrator may open a web browser and access the embedded web server, causing the embedded web server to provide the UI with HTML and XML data that can be operated on using JavaScript. The UI operates by polling periodically for new data by sending an XML data request to the embedded web server, as illustrated in block 216. The UI also periodically requests the synchronization tracking parameter value to make a determination on the status of synchronization between the UI and the server. In block 218, the UI parameter is compared with the server parameter to determine synchronization. Decision block 220 causes processing to proceed along the NO branch if it is determined that the UI is not synchronized with the server. In such an instance, a recovery action is performed, such as by causing the UI to be reloaded for example, as illustrated in block 222. Once the recovery action is performed in block 222, processing proceeds to a decision block 223, where it is determined whether synchronization has been recovered. Various types of recovery mechanisms may be used, such as, for example, initiating a reload of the UI, loading a default or recovery page, displaying a message in the UI prior to submitting a request to the server to reload or render the UI, as well as any other type of recovery action or mechanism to respond to or indicate the loss of synchronization between the client and the server.

If decision block 223 determines that synchronization has been recovered, processing proceeds to block 224, in which the new synchronization tracking parameter is stored in the UI. If decision block 223 determines that synchronization is not recovered, processing proceeds along the NO branch to block 222, where one or more recovery actions are initiated or continue to be performed to attempt to recover synchronization. Various recovery actions (not shown) can be implemented in the case where recovery of synchronization is attempted multiple times, such as displaying a default page or a message that is stored or referred to by the UI, or redirecting the UI to another page or URL while synchronization recovery is attempted. Other mechanisms (not shown) may also be implemented in which synchronization attempts are discontinued at a predetermined number of attempts, or after a specified interval of time expires. Any type of recovery mechanism or action may be used in this instance to communicate the loss of synchronization to the UI and/or attempt to recover synchronization with the server. For example, synchronization can be considered to be recovered if the server provides valid data in response to a request from the UI. Valid data may include a reinitialized synchronization tracking parameter value.

When synchronization is maintained between the UI and the server, decision block 220 detects the same and causes processing to proceed along the YES branch, to block 224 directly, where the synchronization tracking parameter is stored in the UI. Processing then proceeds to block 216 where the server is polled for new data, and the synchronization tracking parameter can be requested and retrieved from the server.

In an exemplary embodiment, the synchronization tracking parameter is a counter maintained on the server, which is incremented linearly with each request submitted by the UI to the server. The UI maintains a counter value in memory, such as in a cache, for comparison with a newly retrieved counter value from the server. In this embodiment, the counter value provided by the server is expected to be greater than the counter value stored by the UI. If the UI determines that the server has provided a counter value less than that stored in the UI, a UI recovery action is performed. The UI recovery can take the form of the UI requesting a complete set of HTML templates and XML data files from the server to be received at the client for rendering the UI in conjunction with JavaScript. When the UI requests a reload and receives the complete set of HTML templates and XML data files, the UI rendered in conjunction with JavaScript may have a completely different look and configuration than that prior to the reload. For example, the network service device or embedded web server can be updated with a new configuration having new parameters or features or can be provided with a new display format for the parameters provided from the network service device. Accordingly, the UI reload as a recover mechanism can implement an upgrade on the client network device. For example, the UI may, after reload, include new menus or new menu options, or be rendered in a different format.

The operations herein described are purely exemplary and imply no particular order. Further, the operations can be used in any sequence when appropriate and can be partially used. With the above embodiments in mind, it should be understood that the invention can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this invention. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the invention.

What is claimed is:

1. A method for synchronizing a user interface with a network service device in a packet switched network, the network service device being configured for unidirectionally triggered communication in relation to requests submitted to the network service device, the method comprising:
    sending a request from the user interface to the network service device to prompt a synchronization indicator maintained by the network service device to be updated in a trend, the synchronization indicator modified in response to receiving the request to provide a first synchronization value that indicates an operating state of the network service device;
    receiving a response at the user interface that is responsive to the request provided to the network service device, the response including the first synchronization value, the first synchronization value generated based on a state of the synchronization indicator;
    storing the first synchronization value at the user interface;
    receiving another response at the user interface that is responsive to another request provided to the network service device that prompts another update to the synchronization indicator maintained by the network service device in the trend to provide a second synchronization value, the another response including the second synchronization value, the state of the synchronization indicator modified in response to receiving the another request from the user interface to provide the second synchronization value, the second synchronization value generated based on the state of the synchronization indicator;
    comparing at the user interface the second synchronization value with the first synchronization value stored by the user interface to determine whether a synchronization criteria is satisfied; and
    performing a recovery action for the user interface when the synchronization criteria is not satisfied.

2. The method according to claim 1, wherein performing the recovery action further comprises sending a reload request from the user interface to the network service device.

3. The method according to claim 2, further comprising sending the reload request from the user interface by changing a parent location to a root of the user interface.

4. The method according to claim 2, further comprising:
    polling the network service device for new data from the user interface, wherein the polling permits retrieval of data from the network service device that is lesser in volume than the data retrieved from the network service device when the user interface is reloaded.

5. The method according to claim 1, wherein performing the recovery action further comprises loading one or more of a default page or warning in the user interface.

6. The method according to claim 1, wherein performing the recovery action further comprises sending a request from the user interface to the network service device to load a portion of the user interface.

7. The method according to claim 1, further comprising:
    storing, under control of the user interface, the second synchronization value provided from the network service device if the comparison results in a determination that the second synchronization value is advanced beyond the first synchronization value.

8. The method according to claim 1, further comprising:
    resetting the synchronization indicator to an initial value upon the occurrence of one or more initializing events.

9. The method according to claim 8, wherein the initializing events are one or more of a network service device power up, cold or warm boot, re-enablement, reconnection, upgrade or reconfiguration.

10. A gateway being communicatively coupled to a packet switched network, comprising a processor and a storage memory accessible by the processor, the processor executing instructions from the storage memory to implement the network service device in accordance with the method of claim 1.

11. A user interface being communicatively coupled to a packet switched network, comprising a processor and a storage memory accessible by the processor, the processor executing instructions from the storage memory to implement the user interface in accordance with the method of claim 1.

12. The method as in claim 1, wherein the first synchronization value is different than the second synchronization value.

13. The method as in claim 12, wherein the comparing of the first synchronization value and the second synchronization value indicates that the operating state of the network device has not changed even though the first synchronization value is different than the second synchronization value.

14. The method as in claim 12, wherein comparing includes:
    utilizing the first synchronization value as a threshold value; and
    comparing the second synchronization value to the threshold value to determine whether the user interface is synchronized with the network service device.

15. The method as in claim 14, wherein the network service device resets the synchronization indicator to a value direction opposite a direction of the trend to indicate when there is loss of synchronization between the user interface and the network service device.

16. The method as in claim 1, wherein the network service device initiates modification of the synchronization indicator to indicate a change in the operating state of the network service device.

17. The method as in claim 16, wherein the network service device, independent of receiving the request and the another request from the user interface, initiates modification of the synchronization indicator to indicate the change in the operating state of the network service device.

18. The method as in claim 17, wherein the network service device modifies the synchronization indicator by a sufficient amount opposite the trend to indicate when there is loss of synchronization between the user interface and the network service device.

19. The method as in claim 1 further comprising:
applying an adjustment to the synchronization indicator at a time in between a first operation of modifying the synchronization indicator based on receipt of the request and a second operation of modifying the synchronization indicator based on receipt of the another request.

20. The method as in claim 19, wherein the adjustment indicates a loss of synchronization between the user interface and the network service device.

21. A server for use in a client-server configuration to provide a user interface synchronization between the server and the client, the server comprising:
a memory for storing programmed instructions;
a processor that is communicatively coupled to the memory, the processor executing the programmed instructions to:
provide a synchronization indicator on the server to maintain a synchronization value, the synchronization indicator being resettable to an initial value, the synchronization indicator being indicative of an operational status of the server;
reset the synchronization indicator to the initial value in response to a specified operational status of the server;
receive, at the server, a first request from the client;
update the synchronization indicator value on the server from the initial value to progress in value in a trend in response to the first request received from the client;
provide the updated synchronization indicator value to the client in response to the first request received from the client;
receive a second request from the client in response to providing the updated synchronization indicator value to the client, the second request comprising a reload request; and
provide a reload response to the client in response to the reload request, the reload response being greater in size than a non-reload request.

22. The server according to claim 21, wherein the synchronization indicator is one or more of a counter, a timestamp, a timer or a state of a state machine.

23. The server according to claim 21, further comprising an XML file configured to store the synchronization indicator.

24. The server according to claim 21, wherein the server is implemented in a gateway.

25. The server according to claim 21, wherein the client comprises a web browser.

26. The server according to claim 21, wherein the synchronization indicator is resettable in response to one or more of a network service device power up, a cold or a warm boot, a re-enablement, a reconnection, an upgrade or a reconfiguration command.

27. A client for use in a client-server configuration to provide a user interface synchronization between the server and the client, the client comprising:
a memory for storing programmed instructions;
a processor that is communicatively coupled to the memory, the processor executing the programmed instructions to:
send a first request from the client to the server to (i) prompt a synchronization indicator maintained by the server to be updated in a trend in response to receiving the first request to provide a first synchronization value that represents a server operational status and (ii) prompt a response from the server to provide the first synchronization value from the server to the client;
receive and store the first synchronization value at the client;
send a second request from the client to the server to (i) prompt the synchronization indicator to be updated in the trend to provide a second synchronization value and (ii) prompt a response from the server to provide the second synchronization value from the server to the client;
compare the first synchronization value with the second synchronization value at the client to determine a relationship between the first and second synchronization values; and
perform a user interface recovery action when the relationship between the first and second synchronization values is other than a predetermined relationship.

28. The system according to claim 27, wherein the processor stores the second synchronization value as a new first synchronization value when the relationship between the first and second synchronization values is the predetermined relationship.

29. The system according to claim 27, wherein the predetermined relationship is one or more of greater than or less than.

30. A method for synchronizing a user interface with a server in a packet switched network, the server being configured for unidirectionally triggered communication with the user interface, the method comprising:
maintaining a first synchronization value in the user interface;
sending a request from the user interface to the server to cause (i) a synchronization indicator maintained by the server to be updated in a trend to provide a second synchronization value in response to receiving the request, wherein the synchronization indicator is uniquely associated with the user interface, and (ii) the second synchronization value to be sent to the user interface in response to receiving the request;
receiving at the user interface the second synchronization value from the server in response to the request;
comparing the first synchronization value with the second synchronization value received from the server; and
performing a recovery action for the user interface when the comparison results in a determination of a relationship between the first and second synchronization values that is other than a predetermined relationship.

31. The method according to claim 30, further comprising:
maintaining in the user interface the second synchronization value as a new first synchronization indicator when the comparison results in a determination that the relationship between the first and second synchronization values is the predetermined relationship.

32. A method for synchronizing a user interface with a server in a packet switched network, the server being configured for unidirectionally triggered communication with the user interface, the method comprising:

maintaining a synchronization value in the server, the synchronization value being resettable to an initial value and being uniquely associated with the user interface;

resetting the synchronization value to the initial value in response to a specified operational status of the server;

receiving a first request from the user interface;

updating the synchronization value on the server from the initial value to progress in value in a trend in response to the first request received from the user interface;

providing the updated synchronization value to the user interface in response to the first request received from the user interface;

receiving a second request from the user interface in response to providing the updated synchronization value to the user interface, the second request comprising a reload request; and     providing a reload response to the user interface in response to the reload request, the reload response being greater in size than a non-reload request.

* * * * *